(12) United States Patent
Chen et al.

(10) Patent No.: US 10,127,114 B2
(45) Date of Patent: Nov. 13, 2018

(54) METHOD OF FILE SYSTEM DESIGN AND FAILURE RECOVERY WITH NON-VOLATILE MEMORY

(71) Applicant: AGENCY FOR SCIENCE, TECHNOLOGY AND RESEARCH, Singapore (SG)

(72) Inventors: Cheng Chen, Singapore (SG); Qingsong Wei, Singapore (SG); Jun Yang, Singapore (SG); Chundong Wang, Singapore (SG); Mingdi Xue, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 138 days.

(21) Appl. No.: 15/113,812

(22) PCT Filed: Jan. 23, 2015

(86) PCT No.: PCT/SG2015/050007
§ 371 (c)(1),
(2) Date: Jul. 22, 2016

(87) PCT Pub. No.: WO2015/112094
PCT Pub. Date: Jul. 30, 2015

(65) Prior Publication Data
US 2016/0342479 A1 Nov. 24, 2016

(30) Foreign Application Priority Data
Jan. 24, 2014 (SG) .................. 2014005599

(51) Int. Cl.
*G06F 11/07* (2006.01)
*G06F 11/14* (2006.01)
*G06F 12/02* (2006.01)

(52) U.S. Cl.
CPC ...... *G06F 11/1438* (2013.01); *G06F 11/1471* (2013.01); *G06F 12/0246* (2013.01); *G06F 2201/80* (2013.01); *G06F 2201/805* (2013.01)

(58) Field of Classification Search
CPC .................. G06F 11/1435; G06F 11/1438
(Continued)

(56) References Cited

U.S. PATENT DOCUMENTS 5,974,426 A * 10/1999 Lee ................ G06F 11/1469
7,464,125 B1 * 12/2008 Orszag ............ G06F 11/1435
(Continued)

OTHER PUBLICATIONS

PCT Notification of Transmittal of the International Search Report and the Written Opinion of the International Searching Authority, or the Declaration for counterpart PCT Application No. PCT/SG2015/050007, 9 pp., (dated Aug. 4, 2015).
(Continued)

*Primary Examiner* — Chae M Ko
(74) *Attorney, Agent, or Firm* — Womble Bond Dickinson (US) LLP

(57) ABSTRACT

A method of rebooting a file system using a non-volatile memory is provided. The method comprising persistently storing critical information in the non-volatile memory, the critical information indicating a status of the file system; in response to a predetermined event, obtaining critical information of the file system stored in the non-volatile memory; determining if the file system has crashed based on the critical information; and rebooting from metadata in the non-volatile memory if it is determined that the file system has crashed.

19 Claims, 17 Drawing Sheets

(58) Field of Classification Search
USPC .................................................. 714/15, 19
See application file for complete search history.

(56) References Cited

U.S. PATENT DOCUMENTS

| | | | | |
|---|---|---|---|---|
| 7,617,259 | B1* | 11/2009 | Muth | G06F 11/2058 |
| 7,694,191 | B1* | 4/2010 | Bono | G06F 11/004 |
| | | | | 714/48 |
| 7,711,696 | B2 | 5/2010 | Monsen et al. | |
| 8,818,951 | B1* | 8/2014 | Muntz | G06F 17/30088 |
| | | | | 707/639 |
| 9,020,987 | B1* | 4/2015 | Nanda | G06F 3/06 |
| | | | | 707/821 |
| 9,298,555 | B1* | 3/2016 | Ai | G06F 11/1435 |
| 9,612,924 | B1* | 4/2017 | Joseph | G06F 11/2007 |
| 2008/0040385 | A1* | 2/2008 | Barrall | G06F 12/0246 |
| 2008/0168108 | A1* | 7/2008 | Molaro | G06F 11/1435 |
| 2009/0006494 | A1* | 1/2009 | Hong | G06F 11/0727 |
| 2011/0055184 | A1* | 3/2011 | Buban | G06F 17/3007 |
| | | | | 707/704 |
| 2012/0204060 | A1* | 8/2012 | Swift | G06F 11/1435 |
| | | | | 714/15 |
| 2012/0271799 | A1* | 10/2012 | Barrall | G06F 12/0246 |
| | | | | 707/649 |
| 2014/0006362 | A1* | 1/2014 | Noronha | G06F 3/0641 |
| | | | | 707/692 |
| 2015/0074455 | A1* | 3/2015 | Li | G06F 11/0769 |
| | | | | 714/15 |

OTHER PUBLICATIONS

Jianxi Chen, et al., "FSMAC: A File System Metadata Accelerator with Non-Volatile Memory", 2013 IEEE 29$^{th}$ Symposium on Mass Storage Systems and Technologies (MSST), pp. 1-11, (May 6-10, 2013).

Dushyanth Narayanan, et al., "Whole System Persistence", ACM SIGARCH Computer Architecture News—ASPLOS '12, vol. 40, No. 1, pp. 401-410, (Mar. 3-7, 2012).

* cited by examiner

*Duplex Node mode to Single mode*

Single mode to Duplex Node mode

METHOD OF FILE SYSTEM DESIGN AND FAILURE RECOVERY WITH NON-VOLATILE MEMORY

CROSS-REFERENCE TO RELATED APPLICATIONS

The present application is a U.S. National Phase Application under 35 U.S.C. § 371 of International Application No. PCT/SG2015/050007, filed on 23 Jan. 2015, entitled METHOD OF FILE SYSTEM DESIGN AND FAILURE RECOVERY WITH NON-VOLATILE MEMORY, which claims priority to Singapore Patent Application No. 201400559-9, filed on 24 Jan. 2014.

TECHNICAL FIELD

Embodiments of the present invention relate to a method of rebooting a file system including a non-volatile memory and a corresponding non-transitory computer readable storage medium thereof. In particular, it relates to a method of rebooting a file system using a non-volatile memory during an unexpected power shut down.

BACKGROUND ART

Non-volatile memory or non-volatile storage may be described as computer memory that is capable of retaining stored information even when not powered. Examples of non-volatile memory include read-only memory, spin-transfer torque magnetic random-access memory (STT-RAM or STT-MRAM), phase-change memory (PCM), Non-Volatile Dual In-line Memory Module (NVDIMM), flash memory, most types of magnetic computer storage devices (e.g. hard disks, floppy disks, and magnetic tape), optical discs, and early computer storage methods such as paper tape and punch cards.

The most widely used form of primary storage today is a volatile form of random access memory ("RAM") which is a non-persistent type of storage. Conventionally, the file system recovers from the second storage, such as hard disk, flash storage when the power of the computer system shuts down unexpectedly.

Non-volatile memory, on the other hand, is typically used for the task of secondary storage, or long-term persistent storage. Hence, as the memory is becoming non-volatile, persistency moves to the memory layer. However, the operating system is not aware of this change in the memory persistency.

A need therefore exists to provide a method for rebooting a file system using a non-volatile memory. It is against this background that the present invention has been developed.

SUMMARY OF INVENTION

According to the Detailed Description, a method of rebooting a file system using a non-volatile memory is provided. The method comprises persistently storing critical information in the non-volatile memory, the critical information indicating a status of the file system; in response to a predetermined event, obtaining critical information of the file system stored in the non-volatile memory; determining if the file system has crashed based on the critical information; and rebooting from metadata in the non-volatile memory if it is determined that the file system has crashed.

Additionally, in accordance with the detailed description, a non-transitory computer readable storage medium is provided. The a non-transitory computer readable storage medium includes a set of instructions executable by a processor, the non-transitory computer readable storage medium for rebooting a file system using a non-volatile memory, the set of instructions operable to: persistently store critical information in the non-volatile memory, the critical information indicating a status of the file system; in response to a predetermined event, obtain critical information of the file system stored in the non-volatile memory, determine if the file system has crashed based on the critical information; and reboot from metadata in the non-volatile memory if it is determined that the file system has crashed.

Additionally, in accordance with the detailed description, a system for rebooting a file system is provided. The system comprises a non-volatile memory configured to persistently store critical information, the critical information indicating a status of the file system; a processor configured to obtain critical information of the file system stored in the non-volatile memory in response to a predetermined event; determine if the file system has crashed based on the critical information; and reboot from metadata in the non-volatile memory if it is determined that the file system has crashed.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Figure 1:
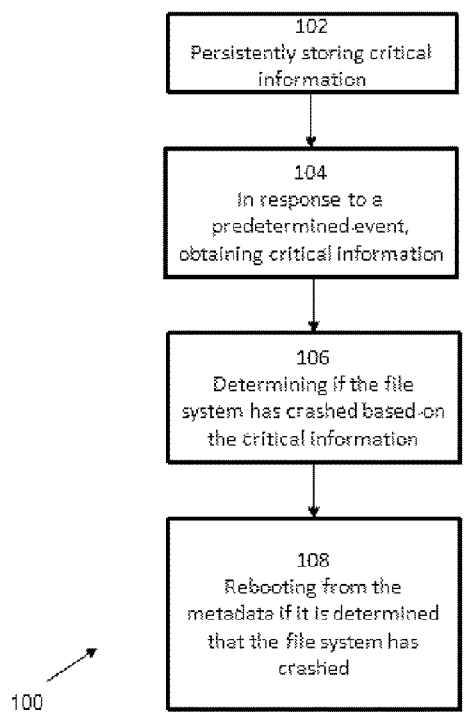
FIG. 1 depicts a flow diagram illustrating an exemplary method of rebooting a file system in the exemplary embodiment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It should be appreciated that the exemplary embodiments presented herein are only examples, and are not intended to limit the scope, applicability, operation, or configuration of the invention in any way. Rather, this detailed description presented below will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "persistently storing", "obtaining", "rebooting", "deriving", "segmenting", "registering", "kinetic modeling", "scanning", "calculating", "determining", "replacing", "generating", "initializing", "processing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or re-configured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium. The computer program when loaded and executed on such a general-purpose computer effectively results in an apparatus that implements the steps of the preferred method.

Various embodiments of this invention relate to methods of rebooting a file system using a non-volatile memory that recognizes and distinguishes between a normal power off and a sudden involuntary power off and performs respectively different reboot sequences based on a determination result of critical information.

A person skilled in the art will understand that memory devices are generally divided into two classes: volatile memory devices and non-volatile memory devices. For the various embodiments below, the volatile memory devices are typically semiconductor memory devices that have a high read/write speed but lose stored data when power supply thereto is interrupted. On the other hand, the non-volatile memory devices can retain stored data even when power supplied thereto is interrupted. Therefore, the non-volatile memory devices are used to store data that must be retained regardless of power supply.

With reference to FIG. 1, there is provided a method of rebooting a file system using a non-volatile memory in accordance with an embodiment. The method (designated generally as reference numeral 100) comprises the following steps:

Step 102: Persistently storing critical information.

In an embodiment, once an application (or a computer program) is initiated, critical information is persistently stored (or continuously stored) in the non-volatile memory until the application stopped running A person skilled in the art will understand that the critical information is associated with a status of a file system associated with the application. In an embodiment, the critical information is associated with metadata extracted from the files and stored in the non-volatile memory. The critical information that is extracted from the files may be stored in a read queue to allow a background thread to process the metadata and populate the non-volatile memory. Additionally, the non-volatile memory may be updated to include user-defined metadata, which is written back to the files. The user-defined metadata is included in a write queue and is written to the files associated with the user-defined metadata. The status of the read and write queues may be exposed to a user through a graphical user interface. In various embodiments below, the metadata may be understood to be data on the files in the file system. The critical information may include the list of files included in the read and write queues, the priorities of each file in each file system, and the status of each file system. In an embodiment, the status of the file system includes a data structure.

For example, the critical information may indicate at least one of a normal-off status, a running status and an abnormal-off status of the file system. In the preferred embodiment, the critical information is configured to change from the normal-off status to the running status during a start-up procedure. Further, the critical information is configured to change to the normal-off status after a shutting-down procedure. Also, the critical information is configured to change to the abnormal-off status when a failure is detected in the file system.

Step 104: In response to a predetermined event, obtaining critical information of the file system.

In the preferred embodiment, the critical information of the file system that is persistently stored in non-volatile memory is obtained in response to a predetermined event. The predetermined event indicates the event that has happened during the critical information is stored. For example, the predetermined event is one during which the file system has crashed and a failure is detected in the file system. Conventionally, there is usually no time to write system status information back to the non-volatile memory when a crash or failure happens. Advantageously, by this technology, a status bit (an example of the critical information) will be modified from 0 to 1 when the file system mounts normally, and will be changed from 1 to 0 when the file system un-mounts successfully. For example if a file system is mounted, it is only necessary to detect the status bit. If the status bit is 1, this means that the file system was not un-mounted successfully.

Step 106: Determining if the file system has crashed based on the critical information.

Following step 104, it is determined whether or not the file system has crashed based on the critical information that has just been obtained prior to the predetermined event. The critical information is configured to change to the abnormal-off status when a failure is detected in the file system. In other words, if the critical information indicates the abnormal-off status means a failure has been detected.

Step 108: Rebooting from metadata in the file system if it is determined that the file system has crashed Following step 106, the next step is to reboot the non-volatile memory if it is determined that the file system has crashed based on the critical information. As stated in the above, the critical information is associated with the metadata concerning the files in the file system. The metadata is also stored in the non-volatile memory. When it is determined that the file system has crashed, the metadata is accessed from the non-volatile memory. It is possible to do this because a portion of the non-volatile memory is modified to isolate an area to store metadata and prevent metadata from being overwritten.

Figure 2:
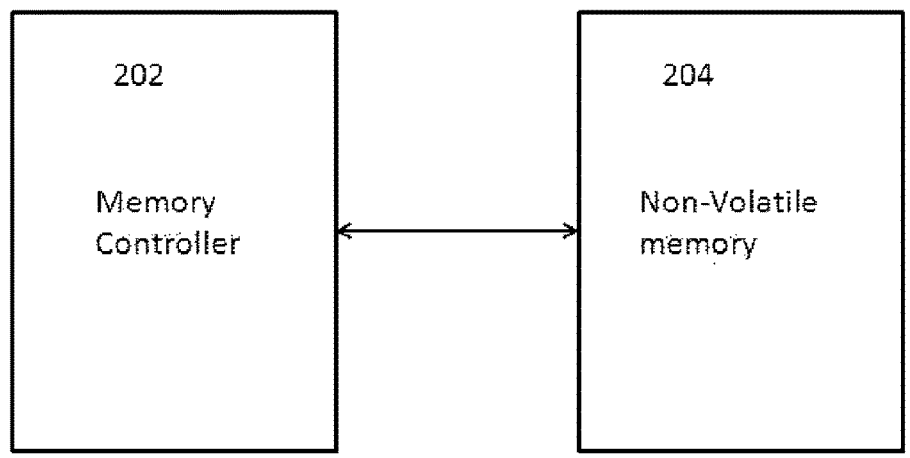
FIG. 2 depicts a schematic block diagram for enabling an exemplary implementation of the method of FIG. 1.

FIG. 2 depicts a schematic block diagram for enabling an exemplary implementation of the method of FIG. 1. FIG. 2 is a block diagram of a non-volatile memory system 200 according to an exemplary embodiment of the present invention. The non-volatile memory system 200 includes a memory cell array 204 formed of a plurality of non-volatile memory cells (not shown individually). The memory cell array 204 may include flash memory cells; however, it will be apparent to those skilled in the art that the present invention can be applied to other kinds of non-volatile memory devices. Additionally, the physical structures of the memory cell array 204, the number of the memory cell arrays 204, the form of the memory cell array 204, and the configuration (e.g., the number of bits to be stored in each cell, types of a memory cell, etc.) of each memory cell constituting the memory cell array 204 are not limited and may vary.

Referring to FIG. 2, the memory cell array 204 and the memory controller 202 together constitute the non-volatile memory system 200. The non-volatile memory system 200 of FIG. 2 may constitute a memory card and/or a memory card system (e.g., memory card reader and memory card), or a solid state drive/disk (SSD), or a hybrid drive using a non-volatile memory for storing data.

The memory controller 202 is configured to communicate with an external host (e.g., computer system, not shown) via a known interfaces such as a universal serial bus (USB), a multi-media card (MMC), peripheral component interface (PCI)-E, advanced technology attachment (ATA), serial-ATA, parallel-ATA, a small computer system interface (SCSI), SAS(Serial Attached SCSI), an enhanced small disk interface (ESDI), and integrated drive electronics. The memory controller 202 controls the non-volatile memory 204 when an access for the non-volatile memory 204 is requested from the host. For example, the memory controller 202 controls a read/write/erase operation of the non-volatile memory 204. Moreover, the memory controller 202 manages mapping information of the non-volatile memory 204 to allow the host to utilize the non-volatile memory 204 as storage medium in which a read/write/erase operation is performed without access restrictions like as if it were an SRAM or a hard disk drive HDD.

Figure 3:
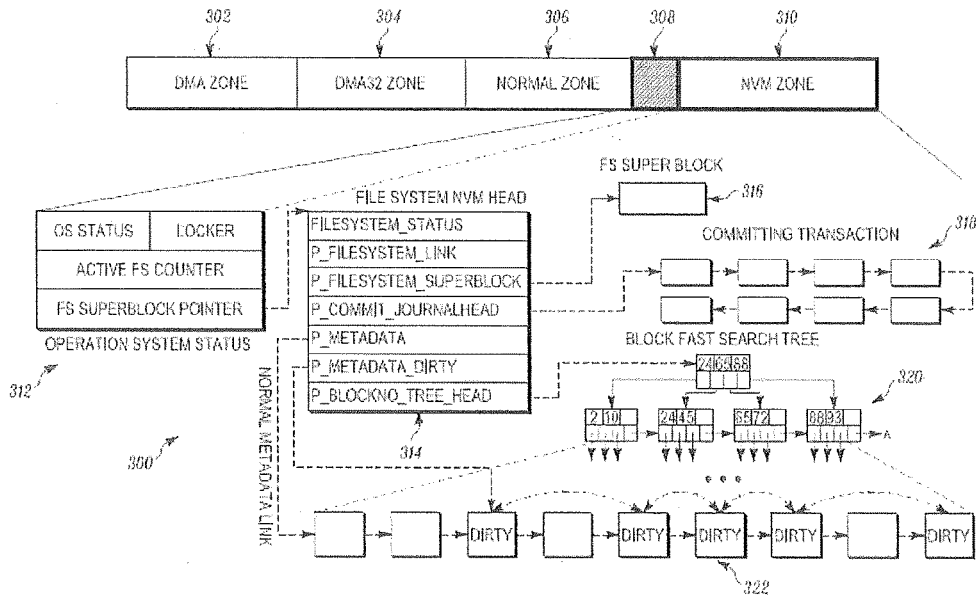
FIG. 3 depicts a schematic block diagram of an exemplary non-volatile memory of the schematic block diagram of FIG. 2.

FIG. 3 depicts a schematic block diagram of an exemplary non-volatile memory of the schematic block diagram of FIG. 2. FIG. 3 depicts how the memory device may be partitioned. In an embodiment, a Direct Memory Access (DMA) zone 302 and a DMA32 zone 304 are used for device data transmission, and a normal zone 306 is used for storing normal data. A non-volatile memory (NVM) zone 310 is a new zone where metadata is stored. In an embodiment, metadata is linked to at least one normal file system structure. The normal file system structure may comprise at least one of a superblock and a vfsmount. The metadata would not be used by other applications during a start-up procedure of an operation system. Operating system status 312 is a data structure that is stored in a fixed physical memory area which can be found by the operation system when a file system reboots. The operating system status 312 may include information indicating the status of the operating system and pointer pointing the file system superblock (FS superblock). In an embodiment, file system statues can be designed to manage metadata. There are several data fields in the file system status structure. In an embodiment, it is possible to check whether the file system is un-mounted successfully by using the file system status structure.

Also, in an embodiment, a file system superblock field pointer may be included in the file system non-volatile memory head 314 to point to a file system superblock 316. A person skilled in the art will understand that the file system superblock is a record of the characteristics of a file system. For example, the file system superblock includes the size of the file system, the number and the size of the block group, the empty and the filled blocks and their respective counts, the size and location of the inode tables, and the disk block map and its corresponding usage information. The file system superblock pointer may also be used to organize and link all file systems together for collaborative management.

A pointer pointing to committing transactions 318 may also be included in the file system non-volatile memory head 314. A person skilled in the art will understand that committing transactions may be used in file system journals. Committing transactions usually help the file system to maintain metadata and data consistency. For example, during a write operation in the file system, write operation modify the file data and metadata. Further, committing transactions allow original metadata to be recorded before the write operation. If a failure happens during the write operation, metadata can be copied from the committing transactions back to the non-volatile memory and the status can be adjusted before the write operation.

A pointer pointing to a fast search tree 318 may also be included in the file system non-volatile memory head 314. The fast search tree 318 can be used to accelerate the speed of searching for metadata in the non-volatile memory. Additionally, a metadata head link may be included in the file system non-volatile memory head 314. The metadata head link may be used to link all the dirty metadata in the non-volatile memory zone. A person skilled in the art will understand that dirty metadata refers to metadata modified in the non-volatile memory but not flushed back to the hard disk.

Figure 4:
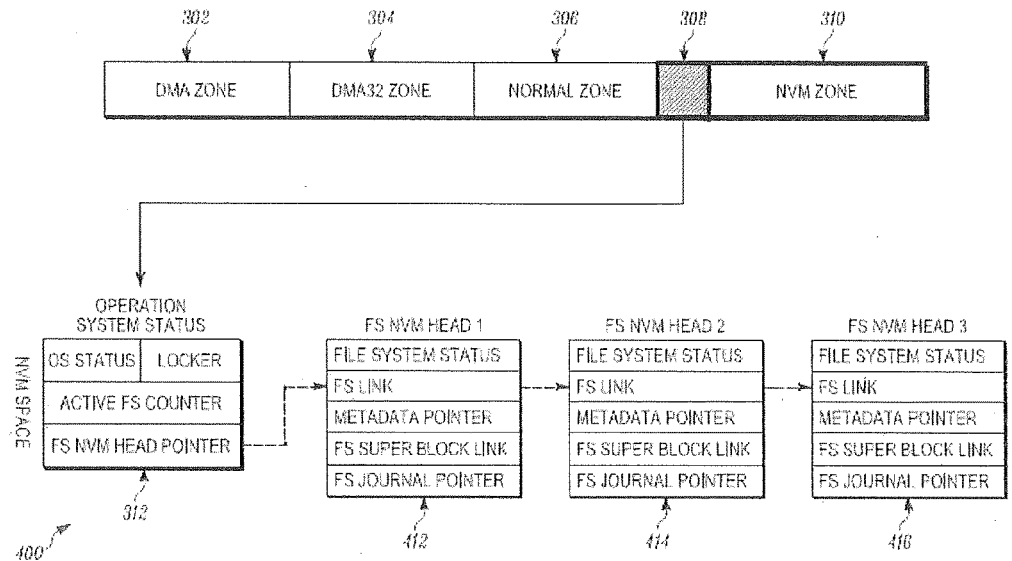
FIG. 4 depicts a schematic block diagram of an exemplary non-volatile memory that supports a plurality of file systems in accordance with an embodiment.

FIG. 4 depicts a schematic block diagram of an exemplary non-volatile memory that supports a plurality of file systems. A person skilled in the art will understand that one server usually supports more than one file system. Referring to FIG. 4, the operation system status 312 includes a file system non-volatile head pointer that points to each file system 412, 414 and 416. In this embodiment, it is possible to obtain critical information from each of the plurality of file systems 412, 414 and 416 and determine whether or not the respective file system 412, 414 and 416 has crashed based on the respective critical information.

Figure 5:
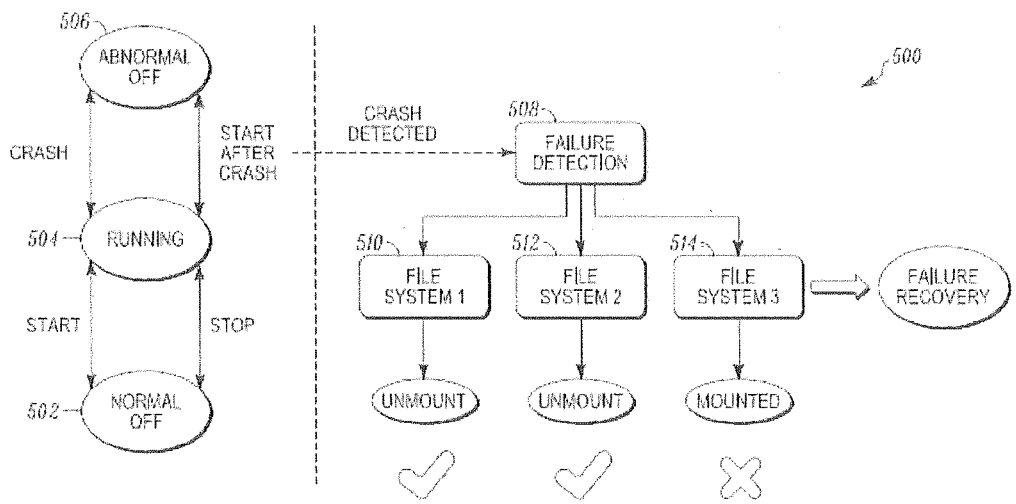
FIG. 5 depicts a flow diagram illustrating an exemplary process of rebooting a file system when a failure is detected utilizing an exemplary non-volatile memory of the schematic block diagram of FIG. 2.

FIG. 5 depicts a flow diagram illustrating an exemplary process of rebooting a file system when a failure is detected. As stated in the above, the critical information may indicate at least one of a normal-off status 502, a running status 504 and an abnormal-off status 506 of the file system. In the preferred embodiment, the critical information is configured to change from the normal-off status 502 to the running status 504 during a start-up procedure. Further, the critical information is configured to change to the normal-off status 502 after a shutting-down procedure. Also, the critical information is configured to change to the abnormal-off status 506 when a failure is detected in the file system. The predetermined event indicates the event that has just happened before the critical information is stored. As such, if it is determined that the file system has crashed based on the critical information, a failure detection process 508 is initiated. The failure detection process 508 may be configured to determine if one or more file system is mounted properly. Referring to FIG. 5, the failure detection process 508 may be configured to determine which one of the file systems 510, 512 and 514 is not mounted properly. For example, if it is determined that the file system 514 is not mounted properly, a failure recovery process will be initiated to recover the file system 514.

Figure 6:
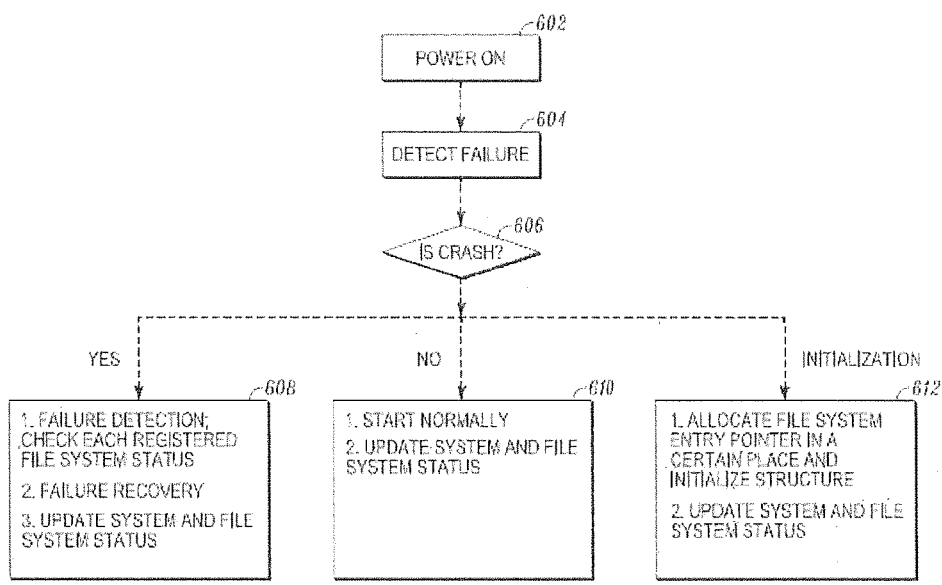
FIG. 6 depicts a flow diagram illustrating an exemplary process of starting an operation system utilizing an exemplary non-volatile memory of the schematic block diagram of FIG. 2.

FIG. 6 depicts a flow diagram 600 illustrating an exemplary process of starting a system. Once the system is powered on in step 602, the critical information persistently stored in the non-volatile memory is obtained to determine if a failure has occurred prior to powering the system on in step 604. As stated in the above, the predetermined event indicates the event that has just happened before the critical information is stored. As such, it is determined if the file system has crashed based on the critical information in step 606. If it is determined that the file system did not crash prior to powering the system on, the system will start normally in step 610. Further, an updating of the file system status may also be carried out in step 610. If it is determined that the file system has not been powered on before, an allocation of the file system pointer will be carried out in step 612. Further, an updating of the file system status may also be carried out in step 612.

Figure 7:
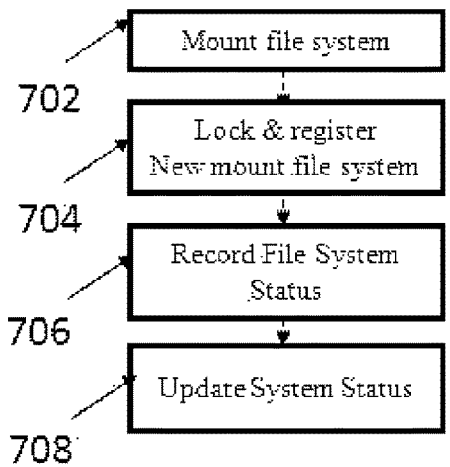
FIG. 7 depicts a flow diagram illustrating an exemplary process of mounting a file system utilizing an exemplary non-volatile memory of the schematic block diagram of FIG. 2.

FIG. 7 depicts a flow diagram 700 illustrating an exemplary process of mounting a file system. In an embodiment, mounting a file system may refer to the attaching of an additional file system to the currently accessing file system of a computer. Once the file system is mounted in step 702, the operating system status structure is locked in step 704. Locking the operating system status structure allows new data structures to be inserted. The file system status is recorded in step 706 and the system status is updated in step 708. The file system is then mounted successfully.

Figure 8:
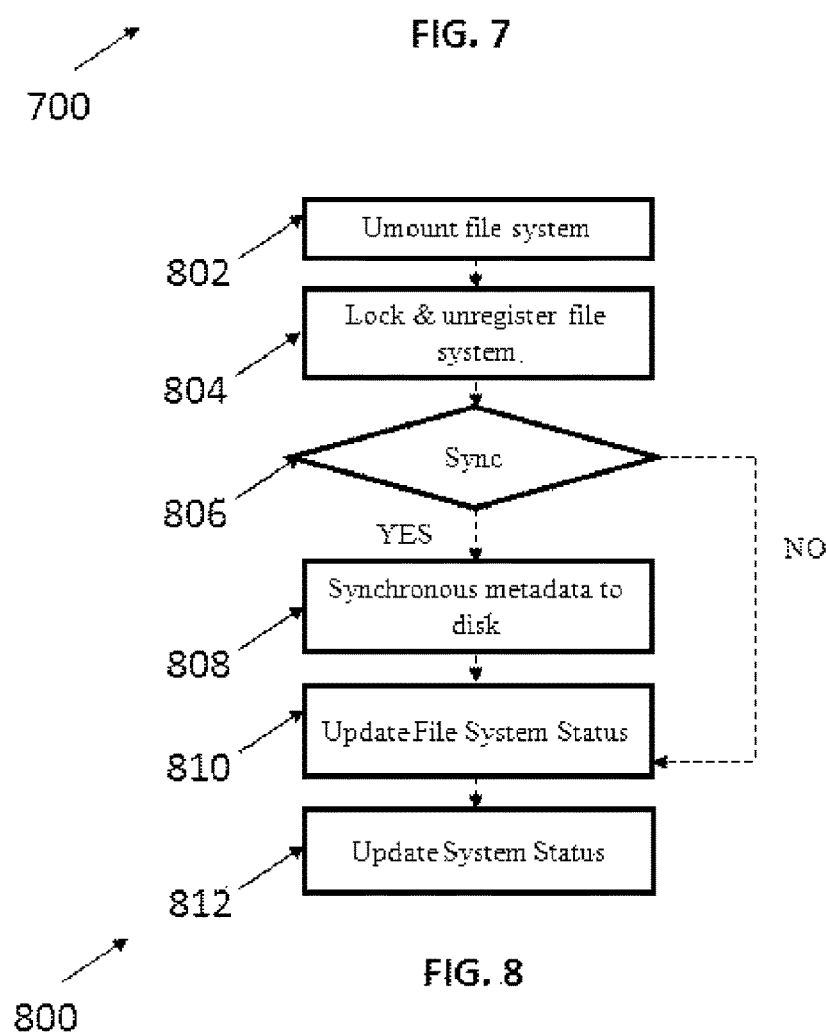
FIG. 8 depicts a flow diagram illustrating an exemplary process of un-mounting a file system utilizing an exemplary non-volatile memory of the schematic block diagram of FIG. 2.

FIG. 8 depicts a flow diagram 800 illustrating an exemplary process of un-mounting a file system. Once the file system is un-mounted in step 802, the operating system status structure is locked in step 804. A user has an option of whether or not to synchronous the metadata associated with the file system to the disk in step 806. In the event that the user would like to synchronous the metadata associated with the file system to the disk, the metadata will be synced in step 808. In the event that the user does not want to synchronous the metadata associated with the file system to the disk, the file system status will be updated in step 810 and the system status will be updated in step 812.

Figure 9:
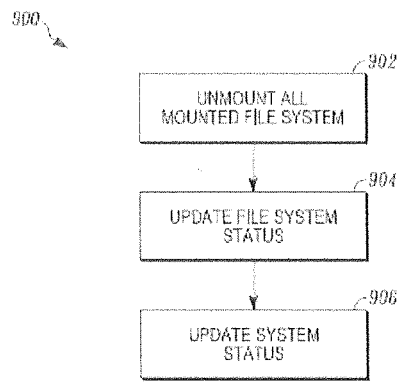
FIG. 9 depicts a flow diagram illustrating an exemplary process of shutting down an operation system utilizing an exemplary non-volatile memory of the schematic block diagram of FIG. 2.

FIG. 9 depicts a flow diagram 900 illustrating an exemplary process of shutting down an operating system. Once the operating system is un-mounted in step 902, the file system status will be updated in step 904 and the system status will be updated in step 906.

Figure 10:
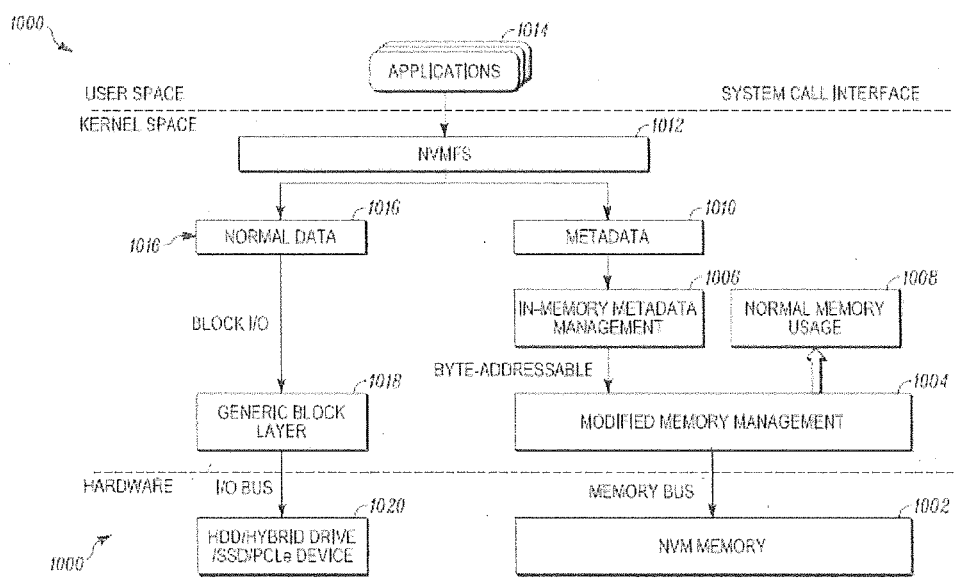
FIG. 10 depicts an overview of a file system design with a second exemplary non-volatile memory.

FIG. 10 depicts an overview of a file system design 100 with an exemplary non-volatile memory. Referring to FIG. 10, there is a non-volatile memory 1002 having a modified memory management unit 1004 that is configured to store metadata in a persistent manner. In an embodiment, an in-memory metadata management 1006 is configured to isolate an area in the non-volatile memory 1002 to store metadata 1010 and prevent the metadata 1010 from being overwritten. Normal data 1016 from applications 1014, on the other hand, are stored in generic blocks 1018. In an embodiment, the generic blocks 1018 can be stored in a hybrid device.

Figure 11:
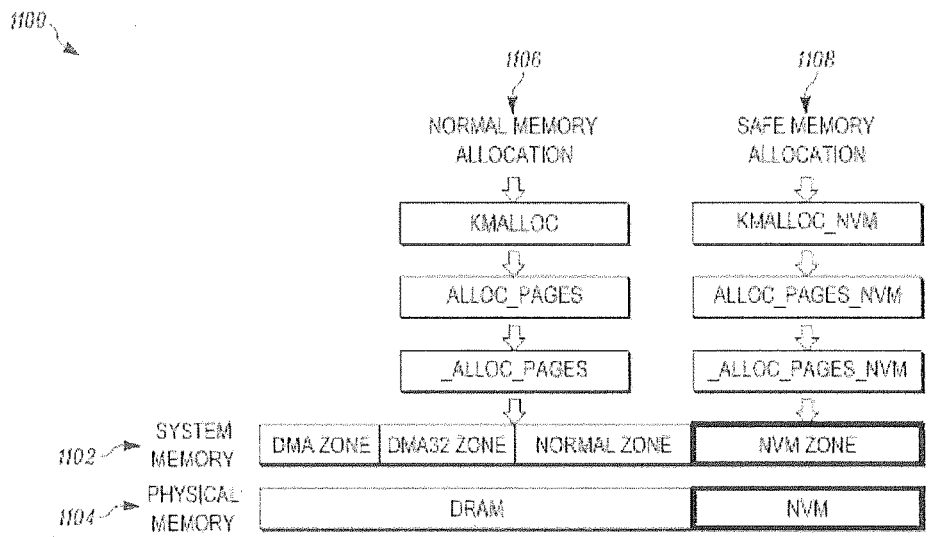
FIG. 11 depicts how an exemplary non-volatile memory is portioned in accordance with the embodiment in FIG. 10.

FIG. 11 depicts how content in an exemplary non-volatile memory is portioned in accordance with an embodiment. Referring to FIG. 11, there is a system memory 1102 and a physical memory 1104. The system memory 1102 is portioned for allocating normal memory 1106 and allocating the content (for example, the metadata) in the non-volatile memory in a manner that prevents the content from being overwritten.

Figure 12:
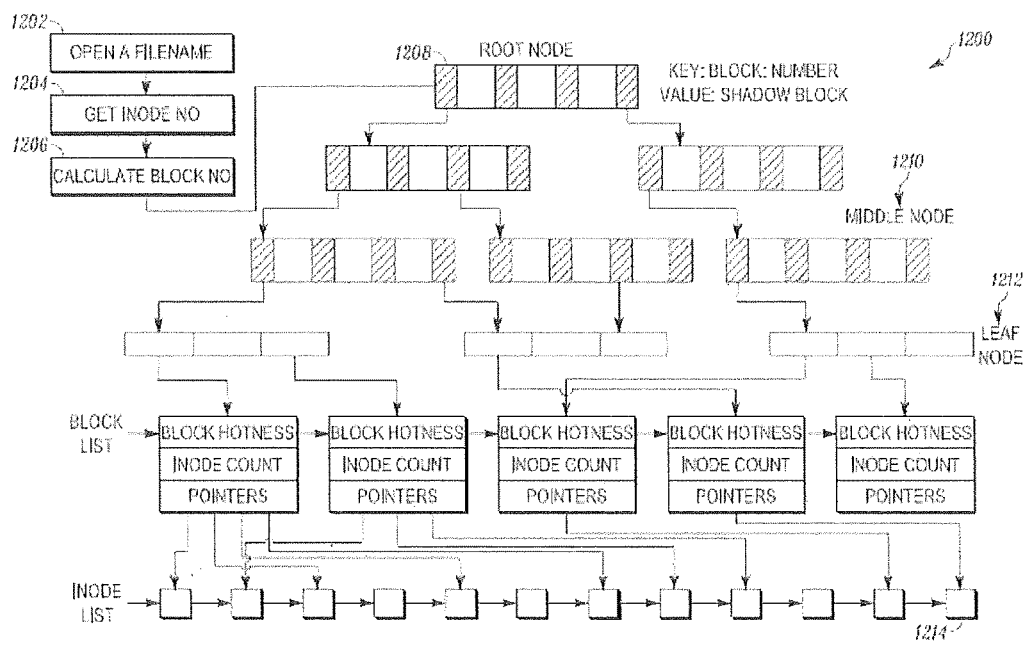
FIG. 12 depicts how metadata is organized in an exemplary non-volatile memory in accordance with the embodiment in FIG. 10.

FIG. 12 depicts how metadata is organized in an exemplary non-volatile memory in accordance with an embodiment. The metadata in the exemplary non-volatile memory provides information about a file in the non-volatile memory. For example, in a unix-style file system, an inode node or an inode is obtained 1204 when a file is opened 1202. A person skilled in the art will understand that the inode is a data structure used to represent a file system object which can be one of various things including a file or a directory. Each inode typically stores the attributes and disk lock location of the system object data. Based on the inode, the block is calculated 1206. Following the calculation of the block 1206, the root node is obtained 1208. From the root node that is obtained, middle node 1210 is determined and leaf node 1212 is determined.

Figure 13:
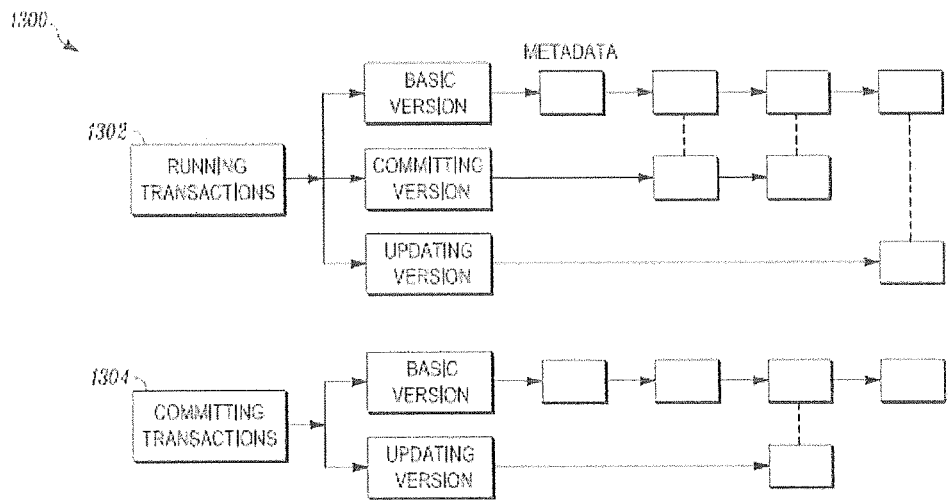
FIG. 13 depicts an exemplary mechanism that can achieve metadata consistency and file system consistency in accordance with the embodiment in FIG. 10.

FIG. 13 depicts an exemplary mechanism that can achieve metadata consistency and file system consistency. Referring to FIG. 13, mechanism 1300 combines inode-based versioning and transaction to guarantee metadata consistency and file system consistency. To do so, the mechanism 1300 uses running transactions 1302 and committing transactions 1304 so that the overhead of maintaining consistency is reduced. Running transactions are computer journal transactions that avoid locks on non-local resources, use compensation to handle failures, potentially aggregate smaller ACID transactions (also referred to as atomic transactions), and typically use a coordinator to complete or abort the transaction.

Figure 14:
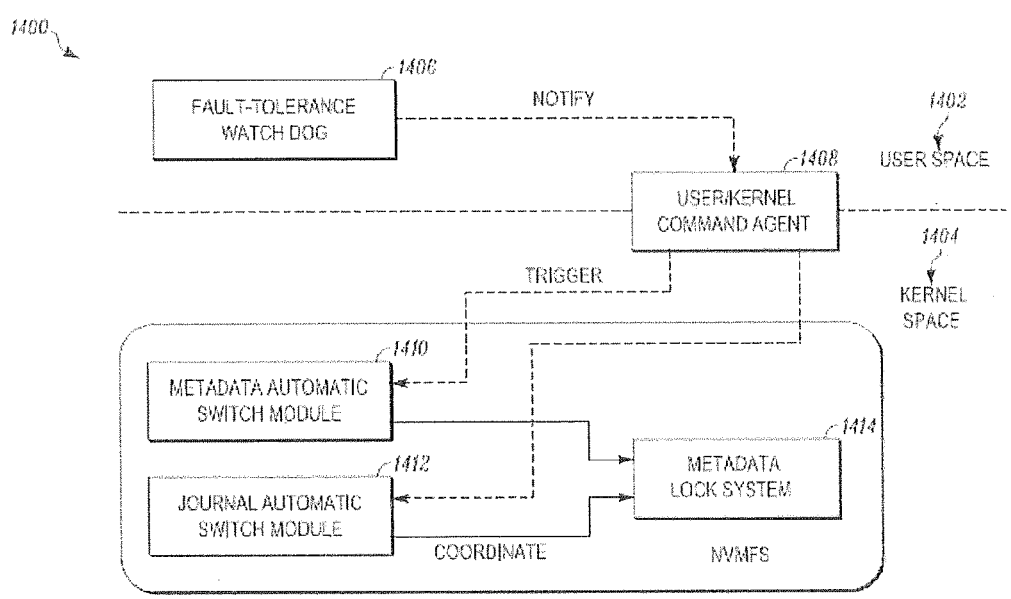
FIG. 14 depicts an architecture of failure detection and file system state transition module in dual state fault-tolerance server.

FIG. 14 depicts an architecture of failure detection and file system state transition module in dual state fault-tolerance server. Referring to FIG. 14, there is a user space 1402 and a kernel space 1404. Further, there is a fault tolerance watch dog 1406 that is configured to detect failure and recovery in at least one of the dual states of the server. For example, if a hardware failure occurs or the system is recovered, the fault tolerance watch dog 1406 will send a notification message to a user/kernel command agent 1408. This will trigger a metadata automatic switch module 1410 and a journal automatic switch module 1412 of a non-volatile memory file system 1416. In the duplex state of the server, both nodes are available and running If a failure is sensed by the fault tolerance watch dog 1406, two steps may be performed to adjust the non-volatile memory file system 1416 to achieve high re-liability. First, all locked metadata for files of the non-volatile memory file system 1416 will be flushed to the block device. This will allow the metadata to be synchronized to the block device. Second, the metadata will not be pinned in memory for a file until the system recovers. Instead, the metadata will be written to the block device for reliability. After these two steps, the server goes into the single node state.

If the server at the single node state receives a notification from the fault tolerance watch dog 1406 that the faulty node has been fixed, it will go back to the duplex state. At this time, the above two steps will be performed. First, the metadata of the files are no longer synchronized with the block device. Second, the metadata to be accessed will be pinned and linked in memory.

In the duplex state of the server, both nodes are available and running If a failure is sensed by the fault tolerance watch dog 1406, all transactions in the running transaction list and the non-volatile memory commit list for journaling will be removed. All new running transaction will go to running transactions, and will subsequently go to the HDD commit transaction list and flush back to the block device.

If the server at the single node state receives a notification from the watchdog that the faulty node has been fixed, it will go back to the duplex state. As for journaling, a commit will be forced which is followed by a checkpoint. Commits for new running transactions are redirected to be recorded in the non-volatile commit list.

Figure 15:
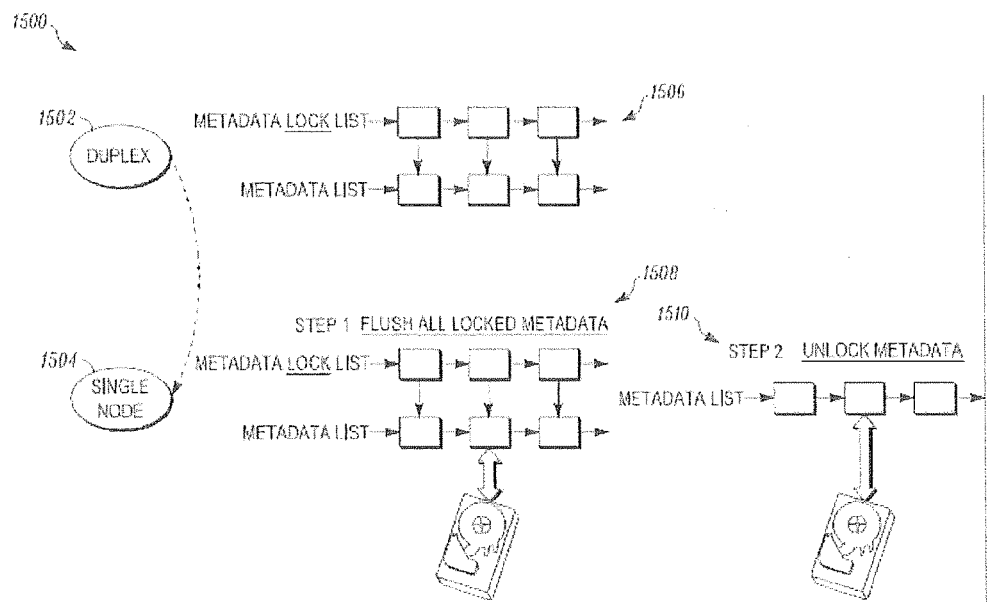
FIG. 15 depicts how metadata is unlocked in a duplex state and flushed in a single node state in accordance with the embodiment in FIG. 14.

FIG. 15 depicts how metadata is unlocked in a duplex state and flushed in a single node state in accordance with the embodiment in FIG. 14. As mentioned in the foregoing, in the duplex state of the server, both duplex node 1502 and single node 1504 are available and running If a failure is sensed by the fault tolerance watch dog 1406, two steps may be performed to adjust the non-volatile memory file system to achieve high reliability. First, all locked metadata for files of the non-volatile memory file system will be flushed to the block device in 1508. This will allow the metadata to be synchronized to the block device. Second, the metadata will not be locked for a file until the system recovers. Instead, the metadata will be written to the block device for reliability in 1510. After these two steps, the server goes to the single node state 1504.

Figure 16:
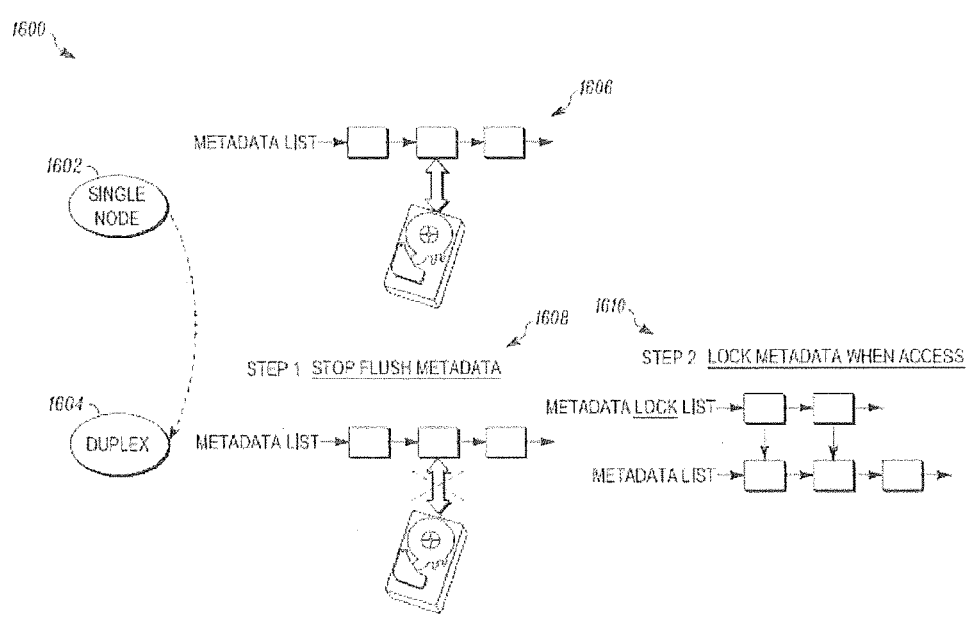
FIG. 16 depicts how metadata stop flush back to storage and locked in a duplex node state in accordance with the embodiment in FIG. 14

FIG. 16 depicts how metadata is locked in a single node state in accordance with the embodiment in FIG. 14. As mentioned in the foregoing, if the server at the single node state 1602 receives a notification from the fault tolerance watch dog that the faulty node has been fixed, it will go back to the duplex state 1604 from 1606. At this time, the above two steps will be conducted. First, the metadata of the files are no longer synchronized with the block device in 1608. Second, the metadata to be accessed will be locked and linked in memory in 1610. After the two steps, the server goes to the duplex state 1604.

Figure 17:
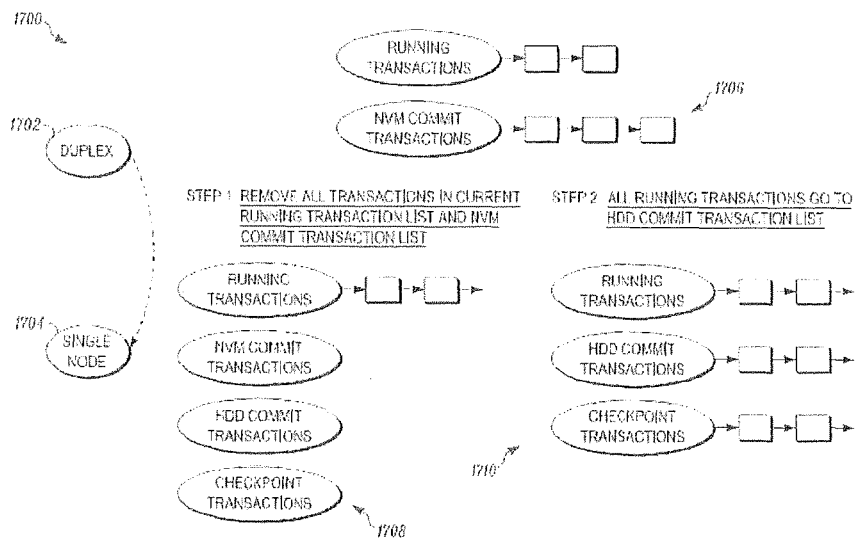
FIG. 17 depicts how the exemplary non-volatile memory is switched from a duplex state to a single node by flushing a journal block to a block device.

FIG. 17 depicts how the exemplary non-volatile memory in accordance with the embodiment in FIG. 14 is switched from a duplex state 1702 to a single node state 1704 by flushing a journal block to a block device. In the duplex state of the server in 1706, both the duplex state 1702 and the single node state 1704 are available and running If a failure is sensed by the fault tolerance watch dog, all transactions in the running transaction list and the non-volatile memory commit list for journaling will be removed at 1708. All new running transaction will go to running transactions, and will subsequently go to the HDD commit transaction list and flushed back to the block device.

Figure 18:
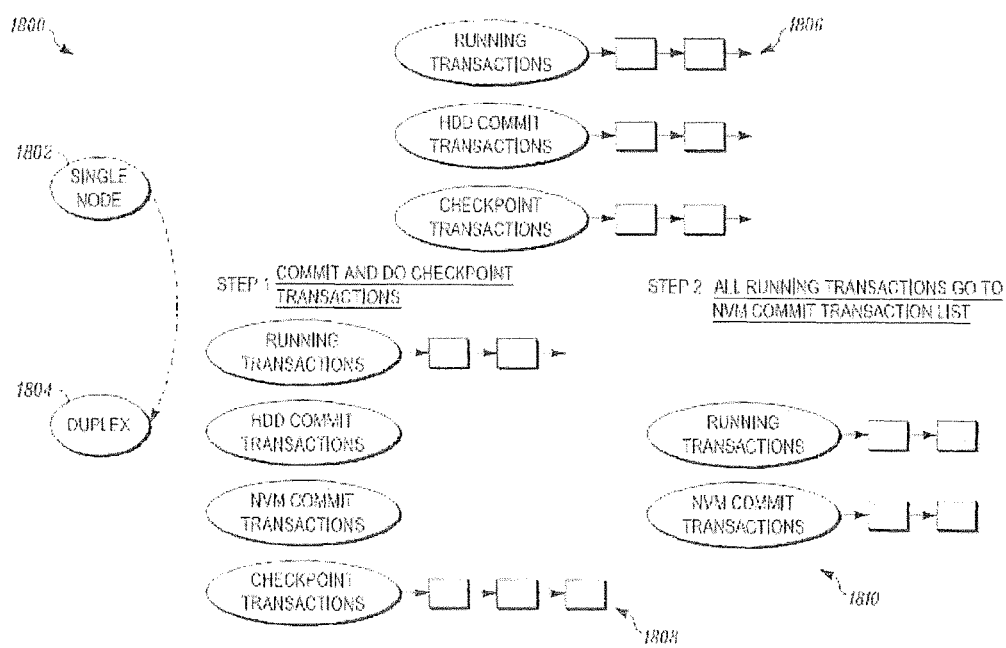
FIG. 18 depicts how the exemplary non-volatile memory is switched back from by journal in-memory commit.

FIG. 18 depicts how the exemplary non-volatile memory in accordance with the embodiment in FIG. 14 is switched back to journal in-memory commit. If the server at the single node state 1802 receives a notification from the watchdog that the faulty node has been fixed in 1806, it will go back to the duplex state 1804. As for journaling, a commit will be forced which is followed by a checkpoint in 1808. Commits for the new running transaction are redirected to be recorded in the non-volatile commit list in 1810.

Figure 19A:
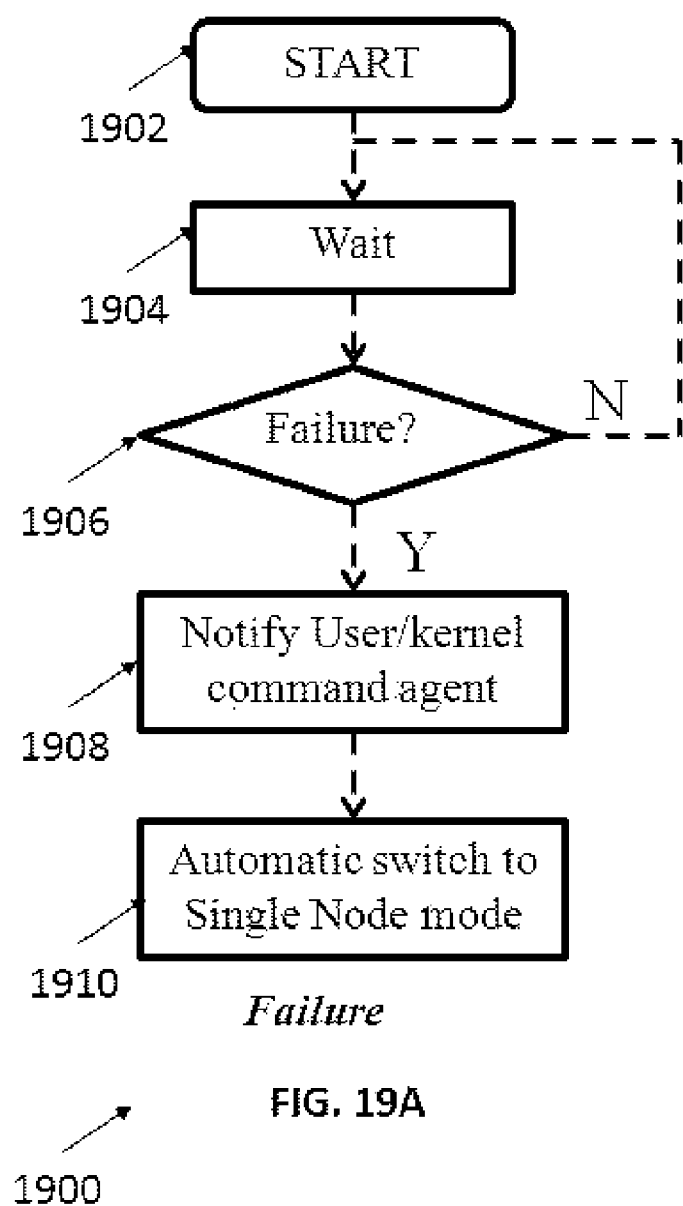
FIG. 19A depicts a flow diagram illustrating an exemplary process of detecting a failure.

FIG. 19A depicts a flow diagram 1900 illustrating an exemplary process of detecting a failure utilizing the exemplary non-volatile memory in accordance with the embodiment in FIG. 14. Once the process begins at step 1902, it will determine if the process proceeds. If the process does not proceed, it will determine if there is a failure in the file system at step 1906. In the event that the process proceeds, it will wait at step 1904 and then determine if there is a failure in the file system at step 1906. The user or a kernel command agent will be notified of the outcome of step 1906 at step 1908. The file system will then be switched to a single node mode at step 1910.

Figure 19B:
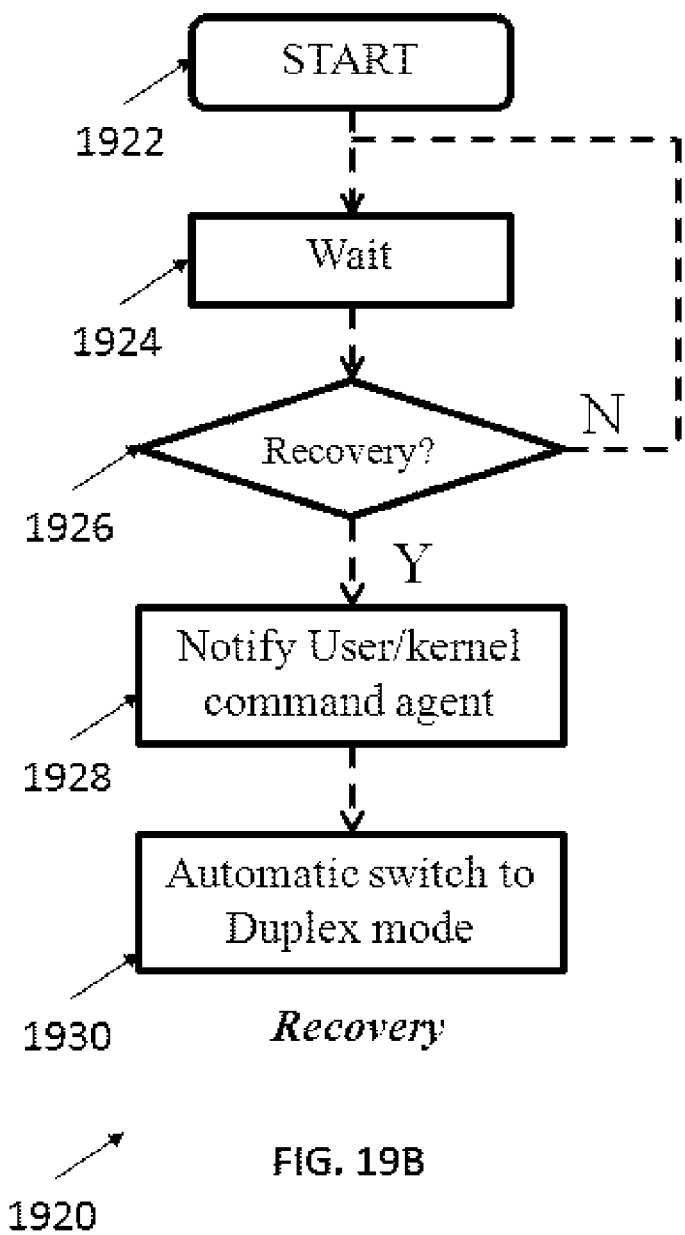
FIG. 19B depicts a flow diagram illustrating an exemplary process of recovering from a failure.

FIG. 19B depicts a flow diagram 1920 illustrating an exemplary process of recovering from a failure in accordance with the embodiment in FIG. 14. Once the process begins at step 1922, it will determine if the process proceeds. If the process does not proceed, it will determine if there is a recovery process in the file system at step 1926. In the event that the process proceeds, it will wait at step 1924 and then determine if any recovery process is initiated in the file system at step 1926. The user or a kernel command agent will be notified of the outcome of step 1926 at step 1928. The file system will then be switched to a single node mode at step 1930.

Figure 20A:
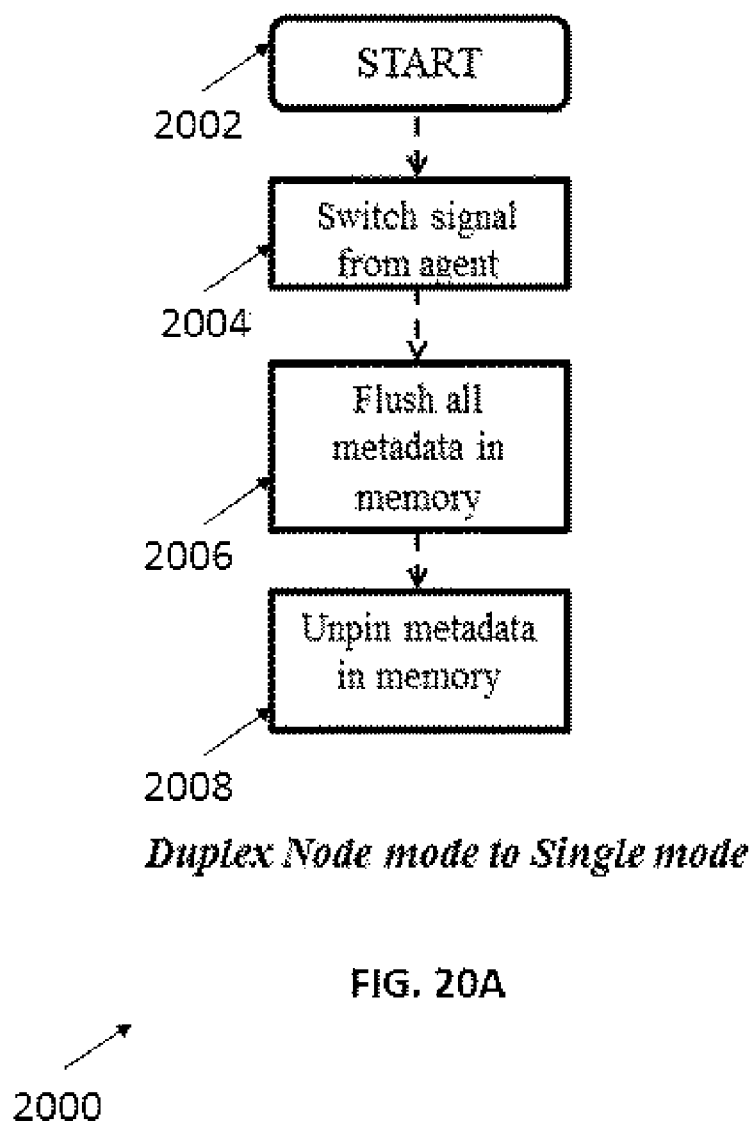
FIG. 20A depicts a flow diagram illustrating an exemplary process of switching from a duplex node mode to a single mode.

FIG. 20A depicts a flow diagram 2000 illustrating an exemplary process of switching from a duplex node mode to a single mode in accordance with the embodiment in FIG. 14. Once the process begins at step 2002, it will switch the signal from the agent at step 2004. At step 2006, the metadata will be flushed into the memory. After the metadata is flushed from the memory, the memory will be unpinned at step 2008 and switched to the single mode.

Figure 20B:
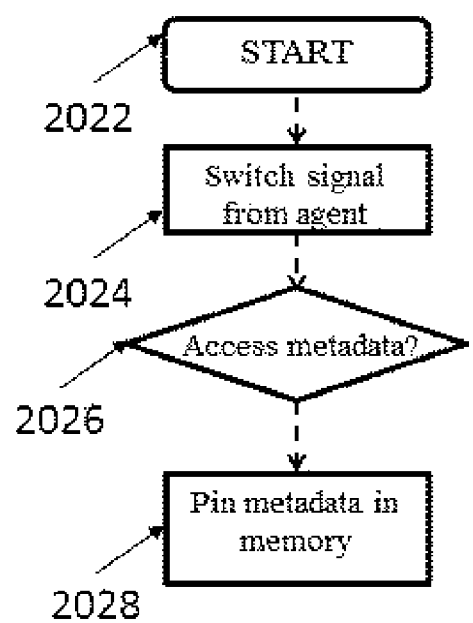
FIG. 20B depicts a flow diagram illustrating an exemplary process of switching from a single mode to a duplex node mode.

FIG. 20B depicts a flow diagram 2020 illustrating an exemplary process of switching from a single mode to a duplex node mode utilizing the exemplary non-volatile memory in accordance with the embodiment in FIG. 14. Once the process begins at step 2022, it will switch the signal from the agent in step 2024. At step 2026, it is determined whether or not to access metadata. After it is determined that the metadata is to be accessed, the memory will be pinned at step 2028 and switched to the duplex node mode.

Figure 21A:
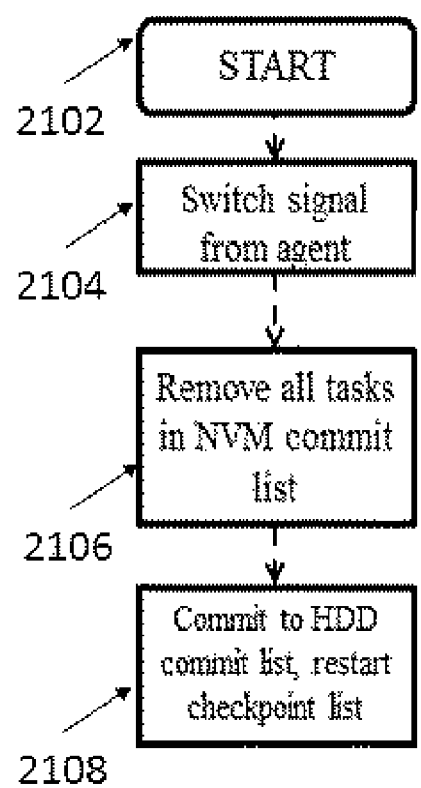
FIG. 21A depicts a flow diagram illustrating an exemplary process of switching a journal mechanism from a duplex node mode to a single mode.

FIG. 21A depicts a flow diagram 2100 illustrating an exemplary process of switching a journal mechanism from a duplex node mode to a single mode in accordance with the embodiment in FIG. 14. Once the process begins at step 2102, it will switch signal from the agent at step 2104. At step 2106, it removes all tasks in a commit list.in the non-volatile memory. Following step 2106, the tasks removed in the commit list are then committed to a HDD commit list and a checkpoint list is restarted at step 2108.

Figure 21B:
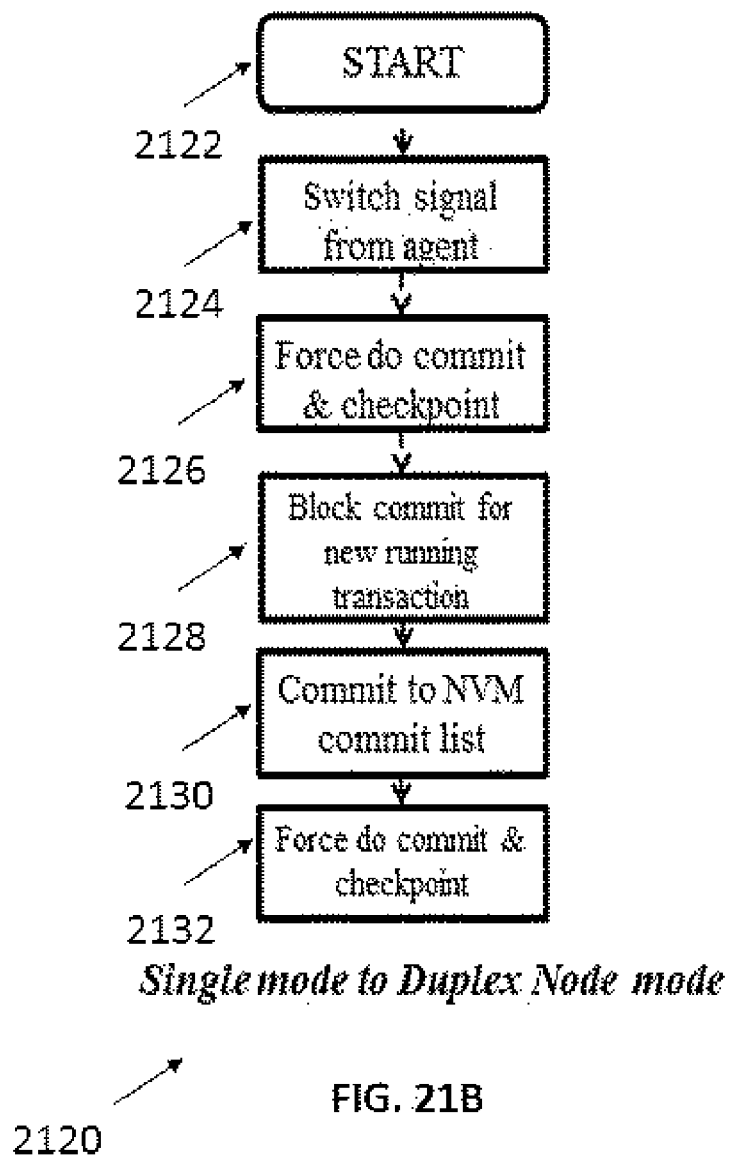
FIG. 21B depicts a flow diagram illustrating an exemplary process of switching a journal mechanism from a single mode to a duplex node mode.

FIG. 21B depicts a flow diagram 2120 illustrating an exemplary process of switching a journal mechanism from a single mode to a duplex node mode in accordance with the embodiment in FIG. 14. Once the process begins at step 2122, it will switch the signal from the agent at step 2124. At step 2126, a commit will be forced which is followed by a checkpoint. The commit will be blocked for new running transactions at step 2128 before committing to the non-volatile memory commit list at step 2130. At step 2132, a commit will be forced which is followed by a checkpoint. The journal mechanism is then switched from the single mode to the duplex mode.

Figure 22:
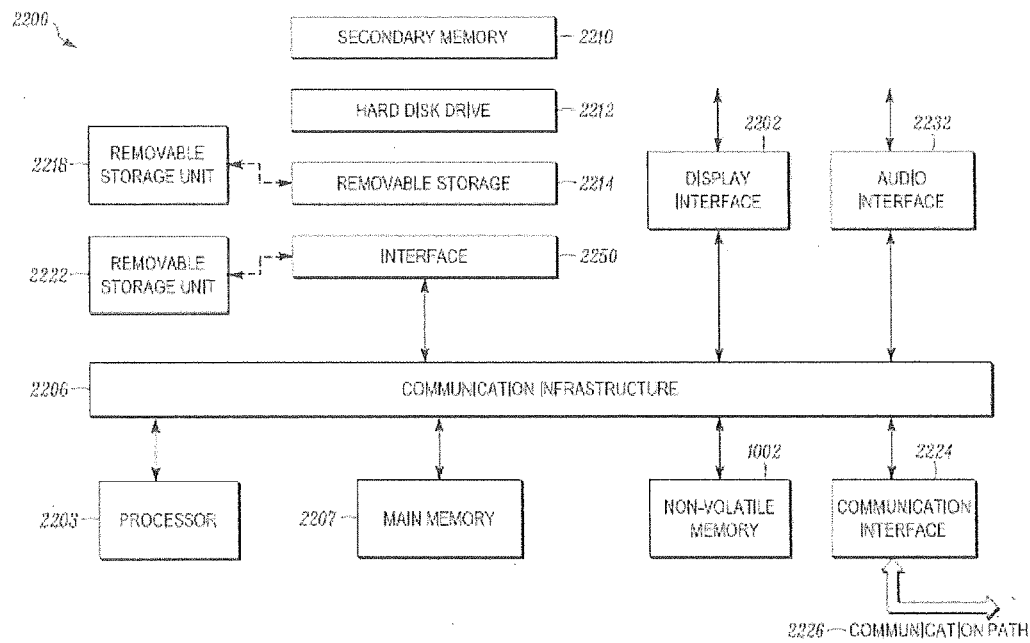
FIG. 22 shows the exemplary computing device in accordance with embodiments of the invention.

As shown in FIG. 22, the computing device 2200 further includes a display interface 2202 which performs operations for rendering images to an associated display 2230 and an audio interface 2232 for performing operations for playing audio content.

As used herein, the term "computer program product" may refer, in part, to removable storage unit 2218, removable storage unit 2222, a hard disk installed in hard disk drive 2212, or a carrier wave carrying software over communication path 2226 (wireless link or cable) to communication interface 2224 via an interface 2250. A computer readable medium can include magnetic media, optical media, or other recordable media, or media that transmits a carrier wave or other signal. These computer program products are devices for providing software to the computing device 2200. Computer readable storage medium refers to any non-transitory tangible storage medium that provides recorded instructions and/or data to the computing device 2200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computing device 2200. Examples of transitory or non-tangible computer readable transmission media that may also participate in the provision of software, application programs, instructions and/or data to the computing device 2200 include radio or infra-red transmission channels as well as a network connection to another computer or networked device, and the Internet or Intranets including e-mail transmissions and information recorded on Websites and the like.

The computer programs (also called computer program code) are stored in main memory 2207 and/or secondary memory 2210. Computer programs can also be received via the communication interface 2224. Such computer programs, when executed, enable the computing device 2200 to perform one or more features of embodiments discussed herein. In various embodiments, the computer programs, when executed, enable the processor 2203 to perform features via a communication infrastructure 2206 of the above-described embodiments. Accordingly, such computer programs represent controllers of the computer system 2200.

Software may be stored in a computer program product and loaded into the computing device 2200 using the removable storage drive 2214, the hard disk drive 2212, or the interface 2250. Alternatively, the computer program product may be downloaded to the computer system 2200 over the communications path 2226. The software, when executed by the processor 2204, causes the computing device 2200 to perform functions of embodiments described herein.

In an implementation, the non-volatile memory 1002 may be an additional component that is integrated into the computing device 2200. The non-volatile memory 1002 may be in direct communication with the communication infrastructure 2206. The at least one memory and the computer program code are configured to, with the at least one processor (for example, processor 2203), cause the non-volatile memory 1002 to perform the operations above. The processor 2203 may include the at least one file system mentioned in the foregoing embodiments. During an implementation of any of the foregoing embodiments, the metadata concerning the at least one file system may then be persistently stored in the non-volatile memory 1002.

It is to be understood that the embodiment of FIG. 22 is presented merely by way of example. Therefore, in some embodiments one or more features of the computing device 2200 may be omitted. Also, in some embodiments, one or more features of the computing device 2200 may be integrated. Additionally, in some embodiments, one or more features of the computing device 2200 may be split into one or more component parts.

Figure 23A:
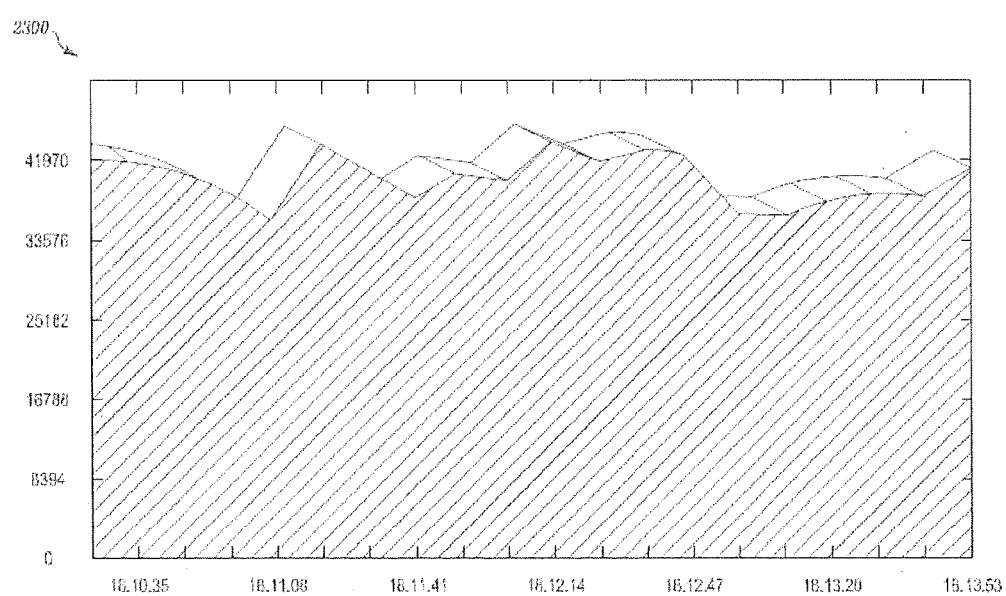
FIG. 23A depicts performance of a computing device using conventional software.
Figure 23B:
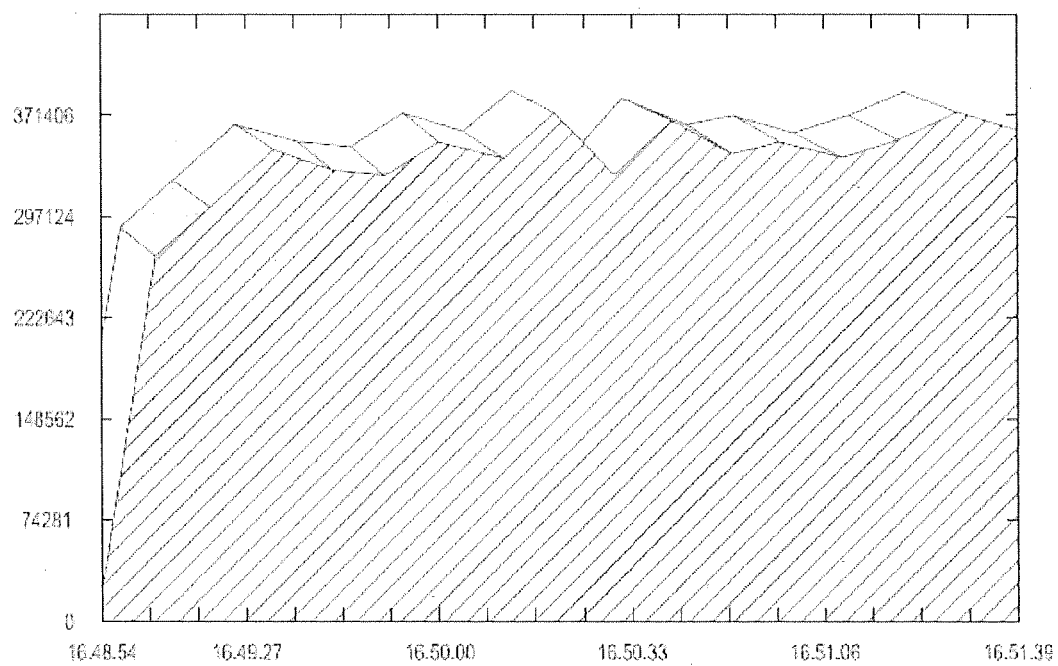
FIG. 23B depicts performance of the computing device using an embodiment of the invention.

FIG. 23A depicts performance 2300 of the computer using conventional software and FIG. 23B depicts performance 2302 of the computer using an embodiment of the invention. Referring to FIG. 23A and FIG. 23B, it can be seen that the performance of the computer using various embodiments of the technology can perform up to 9 times faster than conventional technology.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. It should further be appreciated that the exemplary embodiments are only examples, and are not intended to limit the, applicability, operation, or configuration of the invention in any way. Rather, the foregoing detailed description will provide those skilled in the with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A method of rebooting a file system using a non-volatile memory, the method comprising:
persistently storing critical information in the non-volatile memory, the critical information indicating a status of the file system;
in response to a predetermined event, obtaining critical information of the file system stored in the non-volatile memory;
determining if the file system has crashed based on the critical information; and
rebooting from metadata in the non-volatile memory if it is determined that the file system has crashed, wherein the file system is in a duplex state before the predetermined event and is configured to switch to a single state when it is determined that the file system has crashed to allow the metadata to be flushed to a block device.

2. The method according to claim 1, wherein the critical information comprises a data structure indicating the status of the file system.

3. The method according to claim 1, wherein the metadata is linked to at least one normal file system structure.

4. The method according to claim 1, further comprising initiating a failure detection process when a failure is detected in the file system.

5. The method according to claim 4, wherein the critical information indicates at least one of a normal-off status, a running status and an abnormal-off status,
wherein when the critical information is configured to change from the normal-off status to the running status during a start-up procedure,
wherein when the critical information is configured to change to the normal-off status after a shutting-down procedure, and
wherein when the critical information is configured to change to the abnormal-off status when a failure is detected in the file system.

6. The method according to claim 5, further comprising determining if the file system has been properly shut down after the shutting-down procedure.

7. The method according to claim 1, further comprising persistently storing the metadata in an area of the non-volatile memory such that the metadata will not be overwritten.

8. The method according to claim 1, wherein the predetermined event is one during which the file system has crashed and a failure is detected in the file system.

9. The method according to claim 1, wherein the file system is further configured to switch back to the duplex state when the metadata is flushed to the block device.

10. The method according to claim 1, wherein when the file system has crashed all locked metadata for files of the non-volatile memory are flushed to the block device, and the metadata is not pinned in memory until the file system recovers but written to the block device.

11. A non-transitory computer readable storage medium comprising a set of instructions executable by a processor, the non-transitory computer readable storage medium for rebooting a file system using a non-volatile memory, the set of instructions operable to:
persistently store critical information in the non-volatile memory, the critical information indicating a status of the file system;
in response to a predetermined event, obtain critical information of the file system stored in the non-volatile memory,
determine if the file system has crashed based on the critical information;
flush metadata for files of the non-volatile memory to a block device that allows the metadata to be synchronized to the block device upon determining that the file system crashed, wherein the file system is in a duplex state before the predetermined event and is configured to switch to a single state when it is determined that the file system has crashed; and
reboot from the metadata in the non-volatile memory if it is determined that the file system has crashed.

12. The non-transitory computer readable storage medium according to claim 11, wherein the critical information comprises a data structure indicating the status of the file system.

13. The non-transitory computer readable storage medium according to claim 11 wherein the metadata is liked to at least one normal file system structure.

14. The non-transitory computer readable storage medium according to claim 11, wherein the set of instructions is further operable to initiate a failure detection process when a failure is detected in the file system.

15. The non-transitory computer readable storage medium according to claim 11, wherein the critical information indicates at least one of a normal-off status, a running status and an abnormal-off status,
wherein when the critical information is configured to change from the normal-off status to the running status during a start-up procedure, wherein when the critical information is configured to change to the normal-off status after a shutting-down procedure, and wherein when the critical information is configured to change to the abnormal-off status when a failure is detected in the file system.

16. The non-transitory computer readable storage medium according to claim 14, wherein the set of instructions is further operable to determine if the file system has been properly shut down after the shutting-down procedure.

17. The non-transitory computer readable storage medium according to claim 11, wherein the set of instructions is operable to persistently store the metadata in the non-volatile memory.

18. The non-transitory computer readable storage medium according to claim 11, wherein the predetermined event is one during which the file system has crashed and a failure is detected in the file system.

19. A system for rebooting a file system, the system comprising:

a non-volatile memory configured to persistently store critical information, the critical information indicating a status of the file system;

a processor configured to:

obtain critical information of the file system stored in the non-volatile memory in response to a predetermined event, determine if the file system has crashed based on the critical information; and reboot from metadata in the non-volatile memory if it is determined that the file system has crashed, wherein the file system is in a duplex state before the predetermined event and switches to a single state when a determination is made that the file system has crashed to allow the metadata to be flushed to a block device.

* * * * *